Jan. 24, 1956     A. J. KUHN     2,731,805

REFRIGERATING APPARATUS

Filed Aug. 16, 1952     2 Sheets—Sheet 1

INVENTOR.
Albert J. Kuhn.
BY *Willits, Hardman & Fehr.*

United States Patent Office 2,731,805
Patented Jan. 24, 1956

2,731,805

REFRIGERATING APPARATUS

Albert J. Kuhn, Dayton, Ohio, assignor to General Motors Corporation, Dayton, Ohio, a corporation of Delaware Application August 16, 1952, Serial No. 304,745

6 Claims. (Cl. 62—3)

This invention relates to refrigerating apparatus and more particularly to an automobile air conditioning system.

It is an object of this invention to provide an air conditioning system capable of maintaining maximum comfort under widely varying outdoor air temperatures and car speeds.

One object of this invention is to provide an improved type of temperature responsive means for an automobile air conditioning system.

Another object is to provide an improved arrangement for controlling the flow of refrigerant in an air conditioning system so as to compensate for any unbalance between compressor speed and the heat load.

Still another object of this invention is to provide a temperature responsive means located in the return air duct in the luggage compartment of the car or any other remote location and an adjusting means therefor which may be mounted directly on the dashboard.

A further object of this invention is to so arrange the electric connections to a mercury type control thermostat that an accidental shorting of one of the contacts of the thermostat will not burn out the thermostat.

Another object of this invention is to provide a control wherein a reciprocating control knob may be used for regulating the air temperature and wherein a given amount of movement of the control knob will always result in a proportionate change in the temperature setting.

Further objects and advantages of the present invention will be apparent from the following description, reference being had to the accompanying drawings, wherein a preferred form of the present invention is clearly shown.

Figure 1:
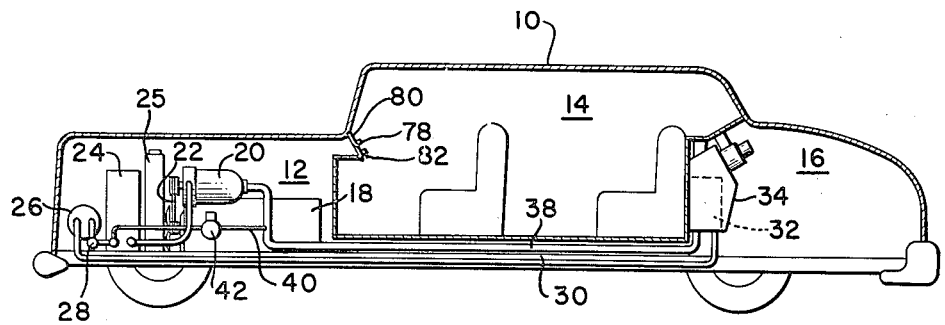
Figure 1 is a vertical sectional view largely schematic showing a passenger automobile equipped with a preferred form of air conditioning apparatus.

Referring now to the drawings wherein a preferred embodiment of the invention has been shown, reference numeral 10 generally designates a conventional passenger automobile having an engine compartment 12, a passenger compartment 14 and a luggage compartment 16. The main car engine 18 is mounted in the engine compartment 12 and serves to drive a refrigerant compressor 20 which is drivingly connected to the engine by means of a belt 22. The compressor 20 discharges the compressed refrigerant into a condenser 24 which is preferably located directly in front of the engine radiator 25. The condensed refrigerant flows from the condenser into a receiver 26 through a check valve 28. A liquid refrigerant line 30 connects the outlet of the receiver 26 to the evaporator unit 32 located in the housing 34 located within the luggage compartment 16.

Figure 3:
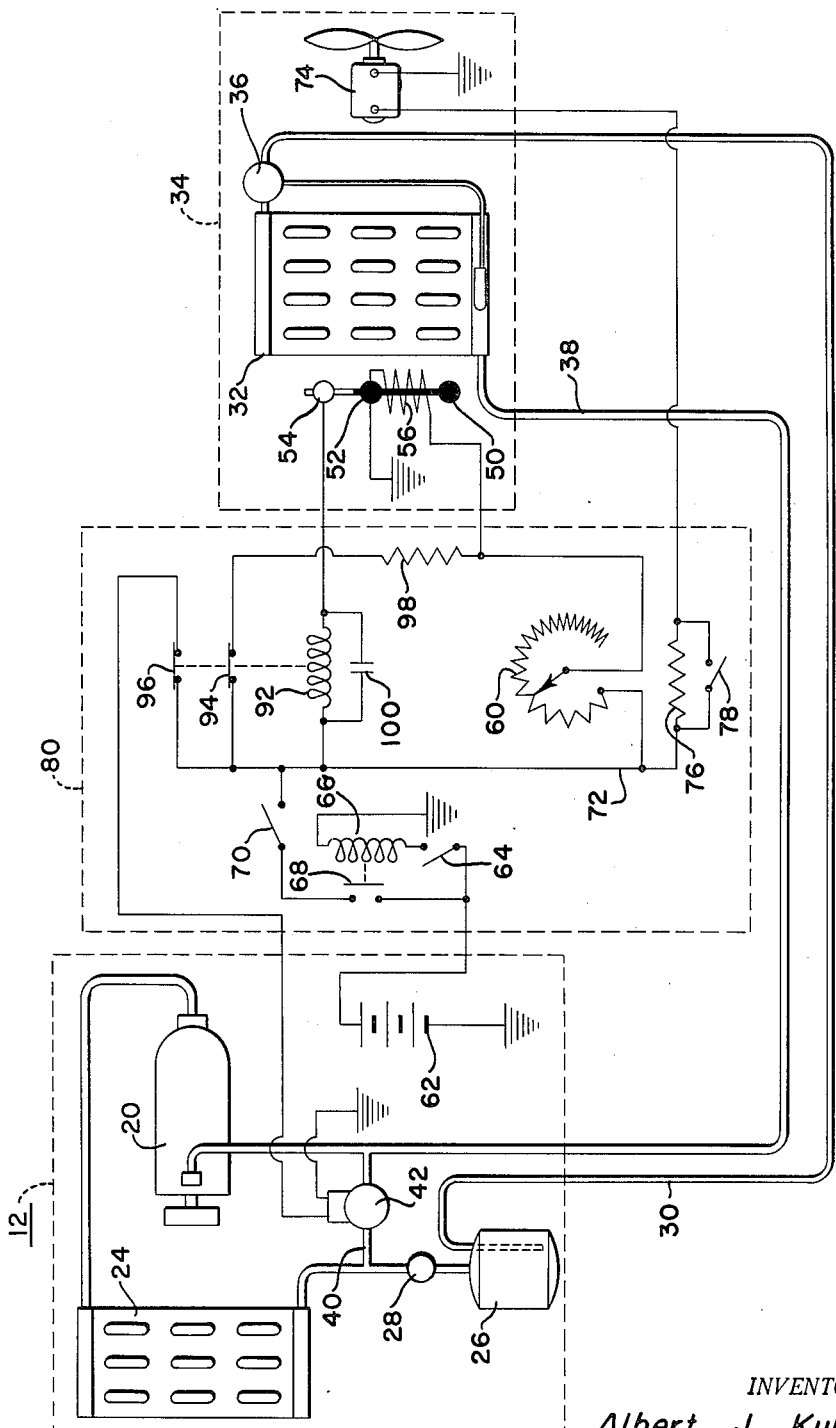
Figure 3 is a diagrammatic view showing the electrical and refrigeration circuits.

A conventional thermostatic expansion valve 36 (see Figure 3) controls the admission of refrigerant to the evaporator 32. The refrigerant vaporized in the evaporator 32 returns to the compressor 20 through the suction line 38. A by-pass 40 connects the suction line to the outlet of the condenser as shown in Figures 1 and 3. A solenoid operated valve 42 controls the flow of refrigerant through the by-pass so that whenever the requirement for cooling has been satisfied the by-pass valve 42 will be opened so as to allow a given amount of refrigerant to flow between the compressor and the condenser without passing through the evaporator. The amount of refrigerant thus by-passed is enough to prevent the compressor from overheating and to stop the refrigerating effect in the evaportaor 32. This by-pass feature is particularly important in an automobile air conditioning system where the compresssor is directly driven from the engine since the engine will at times operate at very high speeds whereby heat will be generated in the compressor even when no air conditioning is required.

In an automobile air conditioning system it is desirable to mount the temperature regulating control on the dashboard of the car where it is within reach of the driver and visible to him. It is not practical, however, to mount the temperature responsive means adjacent the dashboard of the car and for that reason a special type of control has been provided which is especially suitable for use in automobile air conditioning systems. This control comprises a mercury type thermometer or thermostat 50 which is preferably located directly within the evaporator housing 34 in the path of the return air as it is about to come in contact with the evaporator 32. This thermometer is of the type having a first contact 52 arranged to make contact with the main column of mercury in the thermometer and a second contact 54 arranged to make contact with the mercury only when the temperature at the thermometer exceeds a predetermined value.

In thermometers of this type it is not practical to change the location of the contact 54 so as to change the setting at which the circuit is closed by the thermometer. However, the air temperature at which the circuit is closed may be adjusted by placing a heating element 56 adjacent the mercury column as best shown in Figure 3 and then regulating the flow of current through the heating element by means of a rheostat 60. The current for operating the heater 56 is supplied from the usual car battery 62.

Figure 2:
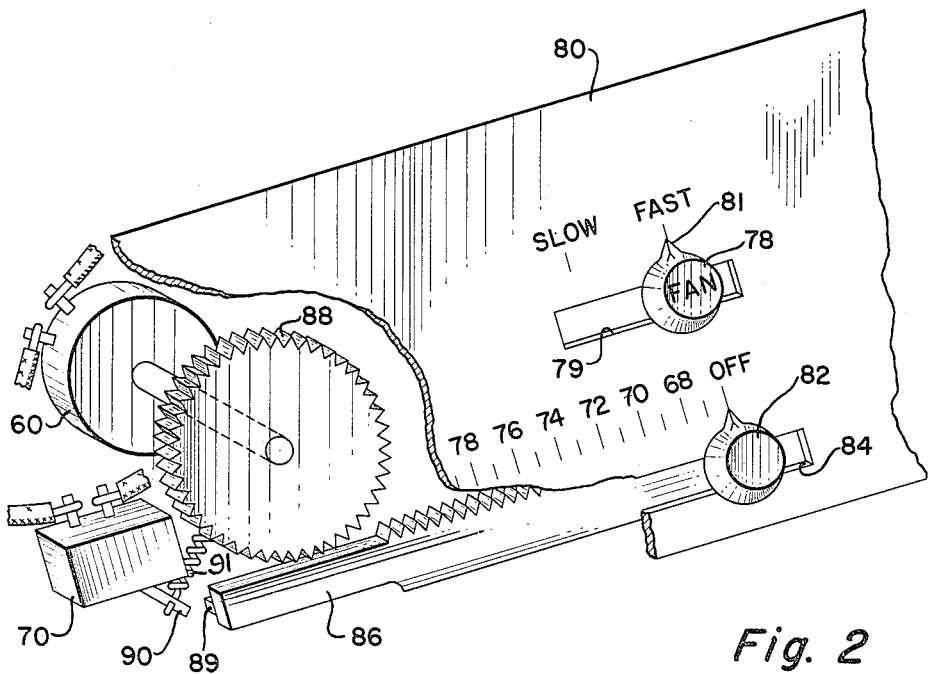
Figure 2 is a fragmentary perspective view somewhat diagrammatic showing the relationship between various controls mounted on the dashboard of the car.

Since the refrigerant compressor 20 derives its power from the main car engine 18 it is obvious that the air conditioning equipment is ineffective except during operation of the car engine. In order to prevent needless drain on the car battery when the engine is shut off, the electrical circuits are so arranged that the ignition switch 64 which controls the ignition system (not shown) of the car must be closed before the air circulating fans and the electrical control equipment can be connected to the battery. Whenever the ignition switch 64 is closed, the solenoid 66 will be energized so as to hold the normally open switch 68 in this closed position. In addition to closing the ignition switch 64 it is also necessary to close the main air conditioning control switch 70. Upon closing the switch 70 current will flow through the line 72 which leads to the controls for the heater 56 and the blower motor 74. The control for the blower motor 74 consists of a resistance element 76 arranged in series with the blower motor 74 so as to normally cause the motor to operate at a slow speed and a switch 78 for shunting out the resistance 76 when it is desired to operate the blower 74 at high speed. The actuator for the switch 78 is preferably mounted on the dashboard or instrument panel 80. For purposes of illustration, the actuator for the switch has been shown as projecting through the panel 80 and as reciprocating in a slot 79. Suitable indicia such as the words "Slow" and "Fast"

are placed above the switch operator so that when the switch 78 short circuits the resistance 76 the pointer 81 on the switch operator will point to "Fast." By virtue of the above described arrangement, it is obvious that the fan will operate at all times when the ignition is on and the air conditioning control switch 70 is closed, even though no cooling is called for by the thermostat 50. As pointed out hereinabove, the exact temperature at which the refrigeration is turned on may be regulated by the rheostat 60. As best illustrated in Figure 2 of the drawing, the rheostat 60 is mounted in back of the instrument panel 80 and is controlled by a slidable knob 82 which projects through a slot 84 in the instrument panel. The knob 82 is secured to a reciprocating rack 86 which drives a pinion 88 secured to the operating shaft of the rheostat 60. By moving the knob 82 to the left, a projection 89 on the rear side of the pinion 86 contacts the operator 90 for the air conditioning control switch 70 so as to close the same. The further the knob 82 is moved to the left the more resistance will be placed in the circuit by the rheostat 60. When the knob 82 is at the extreme left the thermostat 50 will only close its circuit at higher air temperatures since there will be little heating effect produced by the current flowing through the heater 56.

The relationship of the resistance element of the rheostat 60 to the movement of the control knob 80 is such that for any given amount of linear movement of the control knob 82 the temperature setting will be changed the same amount irrespective of the particular temperature range. In order to make this possible the resistance wires of the rheostat are arranged closer together at one end than at the other as shown in Figure 3.

When the mercury in the thermometer makes contact at 54 the solenoid 92 will be energized so as to open the switches 94 and 96. The switch 94 serves to connect the heater element 56 to the battery through a resistance element 98 so as to increase the flow of current through the heating element 56 during the "off" portion of the cycle and thereby decrease the differential of the thermostat. In this way the refrigeration will remain off a shorter length of time and both the temperature and humidity in the conditioned space will remain more uniform. Energization of the solenoid 92 also serves to open the switch 96 so as to interrupt the circuit to the by-pass solenoid 42. This interruption of the flow of current to the by-pass solenoid serves to close the by-pass valve and in that manner force all of the refrigerant to flow through the evaporator.

By placing the thermometer on the grounded side of the circuit no damage can result to the thermometer from accidental grounds occuring in any part of the control system.

A spring 91 biases the switch 70 to the closed position so that when the knob 82 is moved to the "off" position the switch 70 is opened so as to deenergize the solenoid valve 42 and thereby open the by-pass line 40. The condenser 100 is used to absorb the surge resulting from disconnecting the solenoid 92 so as to prevent arcing and damage to the thermometer 50.

By virtue of the above described circuit and structural arrangement, a very practical air conditioning system has been provided wherein the air temperature may be closely controlled and the temperature setting may be accurately and conveniently adjusted.

While the form of embodiment of the invention as herein disclosed constitutes a preferred form, it is to be understood that other forms might be adopted as may come within the scope of the claims which follow.

What is claimed is as follows:

1. In an air conditioning system, an evaporator, a compressor, a condenser, means for connecting the outlet of said compressor to the inlet of said condenser, means for connecting the outlet of said condenser to the inlet of said evaporator, means for connecting the outlet of said evaporator to the inlet of said compressor, by-pass means for returning refrigerant leaving said condenser to the inlet of said compressor without passing through said evaporator, a valve in said by-pass means, a thermostat for controlling said by-pass valve, and means for adjusting the temperature at which said thermostat controls said by-pass valve, said last named means comprising a rotatable rheostat and a reciprocating operator for controlling the operation of said rheostat.

2. In an air conditioning system, an evaporator, a compressor, a condenser, means for connecting the outlet of said compressor to the inlet of said condenser, means for connecting the outlet of said condenser to the inlet of said evaporator, means for connecting the outlet of said evaporator to the inlet of said compressor, refrigerant by-pass means for returning refrigerant leaving said condenser to the inlet of said compressor without passing through said evaporator, a valve in said by-pass means, a thermostat for controlling said by-pass valve, and means for adjusting the temperature at which said thermostat controls said by-pass valve, said last named means comprising a heater in thermal exchange relationship to said thermostat and a rheostat for controlling said heater, and means for increasing the current flowing through said heater in response to opening of said valve.

3. In an air conditioning system, an evaporator, a compressor, a condenser, means for connecting the outlet of said compressor to the inlet of said condenser, means for connecting the outlet of said condenser to the inlet of said evaporator, means for connecting the outlet of said evaporator to the inlet of said compressor, refrigerant by-pass means for returning refrigerant leaving said condenser to the inlet of said compressor without passing through said evaporator, a valve in said by-pass means, a thermostat for controlling said by-pass valve, and means for adjusting the temperature at which said thermostat controls said by-pass valve, said last named means comprising a heater in thermal exchange relationship to said thermostat and a rheostat for controlling said heater, and means for increasing the current flowing through said heater in response to opening of said valve, said last named means comprising a resistance element and a control switch therefor arranged in parallel with said rheostat whereby upon opening of said valve an increased amount of current flows through said heater.

4. In combination with a vehicle having an engine compartment, a passenger compartment, and a luggage compartment, a refrigerating system including a compressor disposed in said engine compartment, a condenser, and an evaporator, means for circulating air for said passenger compartment in thermal exchange relationship with said evaporator, refrigerant flow connections between said compressor, condenser and evaporator, a by-pass for connecting the outlet of said condenser to the inlet of said compressor and means for controlling the temperature in said passenger compartment comprising a solenoid operated valve for controlling the flow through said by-pass, and a mercury type thermostat arranged in the path of the air about to contact said evaporator for controlling said solenoid valve, said thermostat including a rheostat operable from within said passenger compartment for controlling the responsiveness of said mercury thermostat.

5. In combination, a vehicle having an engine compartment, a passenger compartment, and an engine disposed within said engine compartment for propelling said vehicle, a refrigeration system including a compressor disposed within said engine compartment, a condenser disposed within said engine compartment, an evaporator, and refrigerant flow connections between said compressor, condenser and evaporator, a by-pass for by-passing said evaporator, a normally open solenoid valve in said by-pass, a thermostat arranged in thermal exchange relationship with air from said passenger compartment for deenergizing said solenoid valve so as to prevent the flow of refrigerant through said by-pass, means for supplying electric heat to said thermostat, an instrument panel in said passenger compartment, and means on said instrument panel for controlling the application of heat to said thermostat.

6. In an air conditioning system for the passenger compartment of an automobile having an instrument panel in the passenger compartment, an evaporator, a compressor, a condenser, means for connecting the outlet of said compressor to the inlet of said condenser, means for connecting the outlet of said condenser to the inlet of said evaporator, fan means for circulating air over said evaporator and into said passenger compartment, means including a reciprocating knob on said instrument panel for varying the speed of said fan means, refrigerant flow control means, a thermostat for controlling said refrigerant flow control means, and means including a reciprocating knob on said instrument panel for adjusting the temperature at which said thermostat controls said refrigerant control means.

References Cited in the file of this patent

UNITED STATES PATENTS

| | | |
|---|---|---|
| 2,249,223 | Olson | July 15, 1941 |
| 2,286,316 | Snook | June 16, 1942 |
| 2,286,961 | Hanson | June 16, 1942 |
| 2,290,984 | McCloy | July 28, 1942 |
| 2,311,622 | Alexander | Feb. 23, 1943 |
| 2,344,864 | Griswold | Mar. 21, 1944 |
| 2,394,708 | Masek | Feb. 12, 1946 |
| 2,400,334 | Berry | May 14, 1946 |
| 2,401,004 | Lehane | May 28, 1946 |
| 2,454,263 | Newton | Nov. 16, 1948 |
| 2,607,532 | Lehane | Aug. 19, 1952 |
| 2,614,393 | Schulz | Oct. 21, 1952 |

OTHER REFERENCES

Ser. No. 327,080, Pfaff (A. P. C.), published Apr. 27, 1943.